Patented May 17, 1932

1,859,240

UNITED STATES PATENT OFFICE

STROUD JORDAN, OF BROOKLYN, NEW YORK, ASSIGNOR TO ROSS AND ROWE, INC., OF NEW YORK, N. Y., A CORPORATION OF NEW YORK

FOOD PRODUCT AND METHOD OF PRODUCING THE SAME

No Drawing.   Application filed December 23, 1931.   Serial No. 582,875.

This invention has primarily to do with the manufacture of confections, which contain notable quantities of moisture in their finished composition, or those in which notable quantities of water soluble materials have been employed. Broadly speaking, it extends from the incorporation of fats in hard candies through fondants, taffies, caramels, marshmallows, nougats, into confections, in which large quantities of fats are incorporated, such as truffles, mousse and butter brittles.

It is a well known fact that when fat is added to an aqueous sugar solution, unless a satisfactory emulsifying agent is present, the fat will collect in droplets, which do not disperse evenly during the mixing. A greasy and undesirable product is the result. When lecithin and/or allied compounds are properly incorporated, singly or in combination with fats, with or without the addition of water soluble emulsifying agents, such as casein, albumen, gums, pectin, starch and the like, their effect is such that a more uniform distribution is obtained and no greasy taste or feel results.

In this process it is proposed to dissolve lecithin and/or allied compounds, such as phosphatides, in fat when large percentages of fat are used, or to emulsify lecithin and/or allied compounds, in water when small quantities of fat are employed, and then add such an emulsion to the dissolved, mixed, melted or dry batch, after which heat is applied to melt ingredients and proper agitation is employed to thoroughly mix the whole. In this manner the emulsion or solution of lecithin and/or allied compounds, as the case may be, will act in such a manner that particles of fat, which have been broken down into minutely small sizes, will not coalesce, agglutinate or run together and reform large particles or globules of undistributed fat, which produce the characteristic greasy taste and feel.

By this process it is possible to add more fat that it has been possible to do heretofore, on account of the properties of lecithin and/or allied compounds, as hereinbefore set forth. Not only is it possible to add more fat, but by so doing the quality of the finished product is such that its shelf-life is increased and its eating qualities superior to similar confections in which no lecithin and/or allied compounds have been used. By lecithin is meant pure lecithin. However, lecithin as found upon the market, generally contains pure lecithin combined with a diluent, such as fats. The term "lecithin" as employed in the claims, is intended to cover pure lecithin or pure lecithin combined with the diluent.

As an example of my process, in the production of salt water taffy or similar pulled taffies, it is a well known fact that when more than three to five percent of refined fats are introduced, the finished batch, when cooled and before pulling, will leave a streak of chilled and separated fat on the cooling slab, showing that the distribution has not been uniform. After the introduction of a small percentage of lecithin and/or allied compounds, which rarely exceed one percent of the weight of the fat employed, the cooling of a hot and finished batch does not leave the same deposit as where no such emulsifying agents have been employed. To produce goods of this type, I first dissolve the sugars used, and when enough water has been expelled from this solution, the fat, in which the satisfactory emulsifying agent or agents, such as lecithin and/or allied compounds, such as phosphatides, have been dissolved, is incorporated. In producing this salt water taffy, I add 5 to 10 percent by weight of the refined fat, with respect to the weight of the sugar employed. The lecithin is added in from .5 to 1 percent by weight with respect to the weight of the fat. The cook is finished, the product cooled and then pulled or handled in the usual manner for the production of this particular type of goods. The addition of fat, in which the satisfactory emulsifying agent has been incorporated, may be made with or without the addition of milk products of suitable character or other desirable materials.

In the production of caramels, in which large quantities of fats are often employed, I incorporate small percentages of lecithin and/or allied compounds either by emulsifying in milk or water or by dissolving in fat, which is to be added in process. The amounts of satisfactory emulsifier used may be one percent of the total fat weight, but I do not specifically limit it to this amount. Results obtained are positive, for when the proportion of sugars used is such that graining takes place within a comparatively short period of time, say three days, the introduction of lecithin and/or allied compounds retards this graining and shows only a thin crust after a period of three or four weeks, whereas such caramel, in which no such emulsifying agent has been incorporated, will have grained throughout, become dry and brittle and have a consistency similar to fudge. Not only does such an emulsifying agent retard graining in caramels of this nature, but it will actually prevent grain where sugar percentages are such that graining may take place under adverse conditions if no such emulsifier has been used. A further fact, which is of great value, is that fat, distributed through a caramel, to which such a satisfactory emulsifier has been added, will keep sweet and fresh longer than where no such emulsifier has been employed. This is due to the absence of a fat film, which may cover the surface of such products when lecithin and/or allied compounds are not incorporated, and to the further property of lecithin which prevents or retards the hydrolysis of fats. In the production of caramels, I may add 25 to 35 percent by weight of fats with respect to the weight of the sugar employed, and one percent by weight of lecithin with respect to the weight of the fat.

Heretofore it has not been possible to produce satisfactory confections, such as butter brittles, when large quantities of refined vegetable or animal fat have been introduced.

In such cases, the distribution of fat has not been uniform and the finished product has been greasy and decidedly unpalatable. In the production of such brittles I first add to the fat one percent of its weight of lecithin and/or allied compounds or slightly varying amounts thereof, as the case may be, and after this has been thoroughly incorporated, a suitable aqueous solution of materials such as a whole or skim milk solids are mixed with the fat which contains the lecithin and/or allied compounds, and the mixture is then stirred in any satisfactory beater or emulsifier. I may add one to two parts by weight of milk to 7 parts by weight of the fat having the lecithin present therein in one percent by weight of the total weight of the fat. The resulting emulsion may then be added to aqueous sugar solutions and cooked, with or without the addition of nuts, to the desired color and consistency, after which it can be cooled, cut or broken into desired shapes and used without further preparation or for dipping in chocolate or rolling in chocolate and then covering with any desired material, such as ground nuts. Satisfactory results are obtainable by adding from 10 to 15 parts by weight of the emulsion to the sugar solution containing 20 parts by weight of sugar. The results from this process are such that fat does not separate and come to the surface, giving the greasy and unpalatable consistency, which is to be avoided. Further, rancidity does not take place within as short a period of time, since the fat film, appearing on the surface of such pieces in which no lecithin and/or allied compounds has been used, is materially reduced or entirely absent.

In the production of hard candy, it is customary to make a solution of sugar and water and then heat the mass to drive off a desired amount of water so that the mass will have the desired plasticity upon cooling. When the mass is cooled, fatty material is then added to the same and kneaded or worked into the mass. Considerable difficulty has heretofore been experienced in effecting a uniform mixture of the sugar mass and fatty material. I have discovered that this difficulty may be overcome by combining with the fatty material a small percentage of lecithin. I ordinarily employ from five to twenty-five parts by weight of fatty material and 80 parts by weight of sugar. I preferably employ one percent by weight of lecithin with respect to the weight of the fat. When lecithin is added to the fatty material, such fatty material will readily combine with the plastic sugar mass, and be uniformly distributed throughout the same.

In the production of other candies, such as butter scotch, it is customary to make the solution of sugar in water and then heat the mass to drive off the major portion of the water to be removed. A fatty material, such as coconut butter, or dairy butter, which may contain a certain amount of water, is then added to the mass, and the mass is further heated to drive off the remaining portion of the water to be removed. The mass is also suitably stirred during the heat treatment after adding the fatty material. It has been found that difficulty has been experienced in causing the fatty material to suitably combine with the heated sugar solution. By combining a small percent of lecithin with the fatty material, prior to its introduction into the sugar solution, this difficulty is overcome and the fatty material will readily combine with the sugar solution and become evenly distributed through the same, upon suitable agitation. I preferably employ from five to twenty-five parts by weight of fatty material and 80 parts by weight of sugar. I also prefer to add the lecithin in one percent by weight with respect to the weight of the fat.

In the production of nougats, where it is customary to add a satisfactory natural or refined fat in the process of manufacture, the addition of lecithin and/or allied compounds aids materially in the distribution of such fat and also acts to reduce time necessary for distribution, which produces a lighter and more fluffy product than is possible in any other known manner. In this process the albumen required is first dissolved in water, whipped to the desired consistency, and then to it is introduced slowly a syrup of the desired consistency all the time the beater is in motion and beating is continued until maximum volume is obtained. The second part of this batch, which is known as the high-cooked portion, is prepared and heated to the proper temperature, after which it is poured into the mixture already prepared and beating is continued. After all of this second portion has been added, beating is still continued until maximum volume has been obtained. A satisfactory frappé may then be added, if desired, which will swell the batch to an even higher point. After maximum lightness has been obtained, it is customary to add fat cut up in small pieces or the fat may be premelted and added in liquid form. To a small portion of the fat, which has been melted lecithin and/or allied compounds are added in the proportion of one percent of the total fat weight or slightly varying amounts thereof and this is thoroughly dissolved and added to the total fat used before it is added to the lightly beaten batch. Only the necessary amount of stirring is then used to distribute the fat, since prolonged stirring will cause a diminution in volume. After the fat has been distributed, nuts or fruits or any such desired material may be added and distributed by slow stirring. The time used for fat distribution is materially lessened when lecithin and/or allied compounds of any type have been dissolved in the fat, or properly emulsified in aqueous solutions and incorporated with the fat previous to its incorporation. This, in turn, allows the production of maximum volume, which cannot be obtained where no emulsifier of the types mentioned is used, since beating time is thus prolonged and this, in turn, decreases volume.

Whenever sugar is dissolved in water and water is later removed by heating, it is continued to a definite point, which ensures a definite sugar percentage, according to the type of fondant required, and when such a syrup has cooled to a satisfactory point, such as 90 degrees Fahrenheit or lower, as the case may be, it is customary to place it in a beater, and while agitation is in progress, finely divided sugar crystals settle out. This produces the basic material used for so-called sugar creams, fondants and fondant type icings. The time required for the deposition of sugar crystals may be materially lengthened, all other constants being the same, if lecithin and/or allied compounds which have been previously emulsified with water are added, at the point of agitation, such amounts being relatively small in comparison with the total fondant weight; from one one-hundredth to one percent of lecithin, based on the finished fondant weight, will produce satisfactory retardation. When lecithin and/or allied compounds are used, the retarding action causes an increased length of time which is required for complete crystallization of excess sucrose. The finished fondant, in which lecithin and/or allied compounds have been used, exihibits a different physical structure. It is smoother and does not dry out as quickly as where no emulsifier of the type mentioned has been introduced. This is of particular importance in the production of fondant-type icings, in which little or no fat is employed, for gloss is enhanced and characteristics smooth qualities, so desired, are maintained for a considerably longer period of time. If the fondant has been made, by the introduction of water or a saturated sugar syrup into satisfactorily powdered sugar without subsequent evaporation of water, the result is the same; that is, the separation of syrup from the sugar portion is not so noticeable, the consistency is more uniform and the quality of the icing is superior.

In the production of certain soft type confections, in which large quantities of fat are employed, along with aqueous solutions of materials, such as milk solids, it is impossible to make the proper incorporation unless the water has been first partially or entirely removed from the milk and/or other suitable compounds employed. If to the fat used in such a compound, lecithin is added on a ratio of one percent of the fat weight or slightly varying amounts thereof and the temperature of the fat is regulated, so that it is just above its congealing point, the aqueous solution of milk solids and/or other suitable materials may be added to the melted fat and beaten in, which will produce a consistency much lighter and more uniform than will be possible otherwise. For example, I may take twenty-five pounds of coconut fat, fifty pounds of milk chocolate and twenty-five pounds of liquid evaporated milk. To a portion of the coconut fat, say three times the weight of lecithin employed, will be added a half pound of lecithin and/or allied compound and a solution will be made by the application of heat. The chocolate employed will be melted and to it will be added the coconut butter or other satisfactory vegetable and/or animal fat, and after the mixture has thoroughly melted, the whole will be stirred. Temperature will be allowed to fall during which time stirring continues until this mass begins to thicken. At this point the liquid evaporated milk, which has been warmed previously to 120 degrees Fahrenheit, will be added slowly until it is thoroughly incorporated and the mass has reached maximum volume. At this point the portion of fat, in which the proper amount of emulsifier has been incorporated, will be added and incorporated properly, after which the finished mixture may be spread, cast or poured into desired shapes. When it has set sufficiently, it may be used in the production of confectionery centers, which will be suitable for the production of high grade bon bons or other confections. The introduction of lecithin and/or allied compounds makes it possible to distribute the aqueous solution of milk solids through the fat, which is not possible where no such emulsifiers have been used.

I have also found that when ground or whole nuts, containing oil or fat, are introduced into a confection, in the presence of a relatively small amount of lecithin, that the lecithin prevents rancidity and also prevents the fat coming to the surface, which is the cause of a greasy surface. The lecithin is preferably present in one percent by weight of the oil or fat content of the nuts.

Having described my invention, what I claim is:

1. The method of producing a confection containing fats or fat material, comprising forming an emulsion with relatively small percentages of lecithin and water, and combining the emulsion with the remaining ingredients of the confection.

2. A confection containing sugars, added water, refined fat material, and a phosphatide.

3. The method of producing taffies containing sugars and added water, comprising combining a relatively small percentage of phosphatide with refined fats, and combining the mass, thus produced with the remaining ingredients of the taffy.

4. The method of producing taffies containing a fat material, sugars, and added water, comprising adding phosphatide to the same.

5. The method of producing a caramel comprising sugars, added water, and high fat content, comprising the addition of a small percentage of phosphatide to the same.

6. The method of producing butter brittles containing sugars, added water and large quantities of fat materials, comprising adding to the fat material substantially one percent by weight of phosphatide, producing an emulsion from this mass with water, combining the emulsion with an aqueous sugar solution, and cooking the entire mass to produce the finished product.

7. The method of producing a whipped confection containing sugars and added water, comprising whipping the confection batch until the high swell point is reached, and introducing fatty material with a relatively small percentage of added lecithin into the whipped batch, and then stirring the mass to properly distribute the fat without materially lowering the swell of the whipped batch.

8. The method of producing a whipped confection containing sugars and added water, comprising whipping the confection batch until the high swell point is reached, and introducing fatty material into the whipped batch in the presence of phosphatide, and then stirring the mass to properly distribute the fat therein without materially lowering the swell of the whipped batch.

9. In the method of producing a whipped confection containing sugars and added water, the step of combining phosphatide with the fatty material which is to be introduced into the whipped batch at the high swell point of the batch, the presence of the fat emulsifying material rendering it possible to properly distribute the fatty material within the batch without materially lowering the swell of the whipped batch.

10. The method of producing a hard candy, comprising producing an aqueous solution of sugars, heating the solution to drive off a desired amount of water, so that the mass has a desired plasticity, and introducing a fatty material into the plastic mass in the presence of lecithin.

11. The method of producing a confection, comprising producing a solution of sugars in water, heating the solution to drive off the major portion of the water to be removed, combining a relatively small percentage of lecithin with fatty material, introducing the fatty material thus treated into the mass, and continuing heat treatment of the mass in the presence of agitation until a further desired amount of water is driven off.

12. The method of producing the basic material for sugar creams, fondants, and fondant type icings, comprising dissolving sugars in water, heating the mass to drive off a desired amount of water, allowing the mass to cool, adding to the cooled liquid mass an emulsion of phosphatide with an aqueous medium, and agitating the mass, the presence of the emulsion of the phosphatide causing the time required for the deposition of the sugar crystals to be materially lengthened.

13. In the method of producing soft type confections, in which large quantities of fatty materials are employed with materials in an aqueous medium, combining a relatively small percentage of lecithin with the fatty materials, adding materials in an aqueous medium, the resultant mass having its temperature held just above the congealing point, and agitating the mass for producing a homogeneous mixture.

14. In the method of producing soft type confections, in which large quantities of fatty materials are employed with materials in an aqueous medium, combining a relatively small percentage of lecithin with a portion of the fatty materials, combining the materials in an aqueous medium with the remaining portion of fatty materials, introducing the fatty materials containing the lecithin into the mass and maintaining the temperature of the mass just above the congealing point, and agitating the mass for producing a homogeneous mixture.

15. In the method of producing soft type confections, in which large quantities of fat are employed with materials in an aqueous medium, combining the materials in an aqueous medium with the fat in the presence of phosphatide and heat just above the congealing point of the fat, and agitating the mass for producing a homogeneous mass.

16. A confection containing sugars, added water and nuts, said nuts containing oil or fat, and a relatively small percent of lecithin, the lecithin effecting an emulsion between the oil or fat and the water content of the confection when such oil or fat diffuses from the nut into the confection.

17. A confection containing sugars, added water, fat material, and a relatively small amount of lecithin.

18. A confection containing sugars, added water, fat material, and a relatively small amount of phosphatide.

19. A confection containing sugars, added water, at least a normal amount of fat material, and a relatively small amount of phosphatide as an emulsifier.

20. The method of producing a confection containing sugars, added water, and at least a normal quantity of fat containing material, comprising combining a relatively small amount of lecithin with the fat containing material, and then combining this mass with the remaining ingredients of the confection.

21. The method of producing a confection containing a fat containing material, comprising forming an emulsion with phosphatide and water, and combining the emulsion with the remaining ingredients of the confection.

22. A confection containing sugars, added water, refined fat material, and a relatively small percentage of lecithin.

23. The method of producing confections containing fat material, sugars, and added water, comprising adding lecithin to the same.

24. The method of producing butter brittles containing sugars, added water and large quantities of fat materials, comprising adding to the fat material substantially one percent by weight of lecithin, producing an emulsion from the mass with water, combining the emulsion with an aqueous sugar solution, and cooking the entire mass to produce the finished product.

25. The method of producing a hard candy, comprising producing an aqueous solution of sugars, heating the solution to drive off a desired amount of water so that the mass has the desired plasticity, and introducing a fatty material into the plastic mass in the presence of phosphatide.

In testimony whereof, I affix my signature.
STROUD JORDAN.